Dec. 13, 1932.  W. M. VENABLE  1,891,032
MATERIAL HANDLING AND MEASURING APPARATUS
Filed Dec. 26, 1929  3 Sheets-Sheet 1
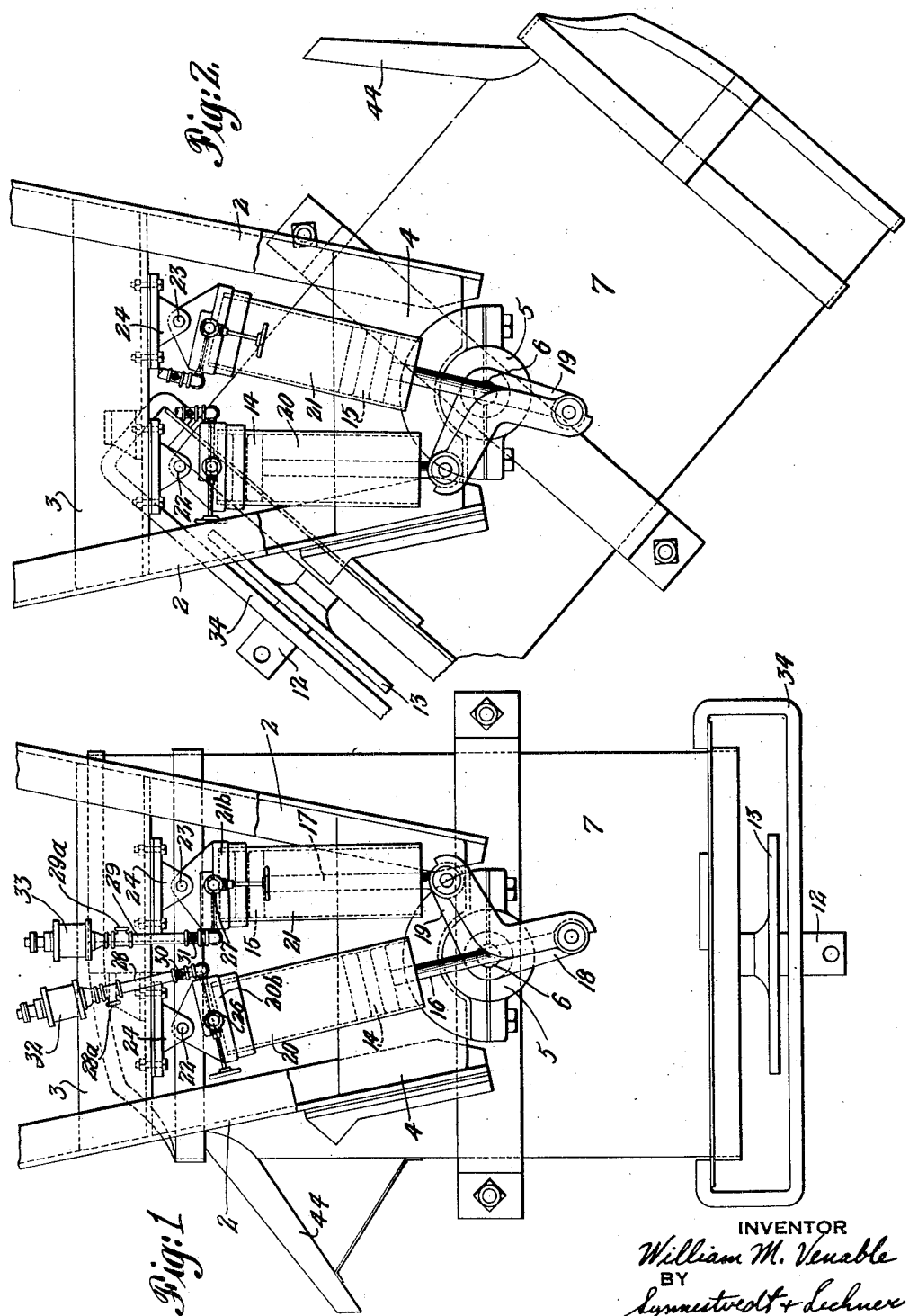
INVENTOR
William M. Venable
BY
Lynnestvedt + Lechner
ATTORNEYS Dec. 13, 1932.   W. M. VENABLE   1,891,032
MATERIAL HANDLING AND MEASURING APPARATUS
Filed Dec. 26, 1929   3 Sheets-Sheet 2

INVENTOR
William M. Venable
BY
Synnestvedt & Lechner
ATTORNEYS

Dec. 13, 1932. W. M. VENABLE 1,891,032
MATERIAL HANDLING AND MEASURING APPARATUS
Filed Dec. 26, 1929 3 Sheets-Sheet 3
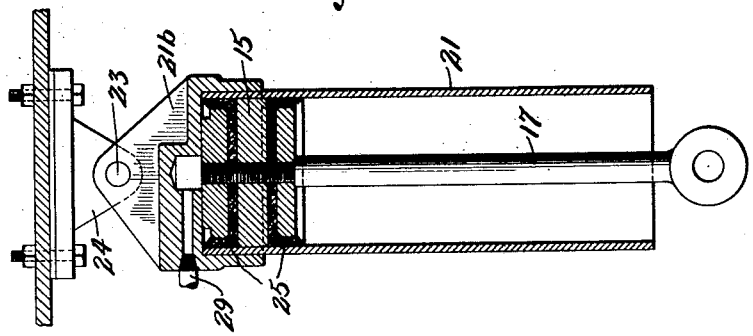
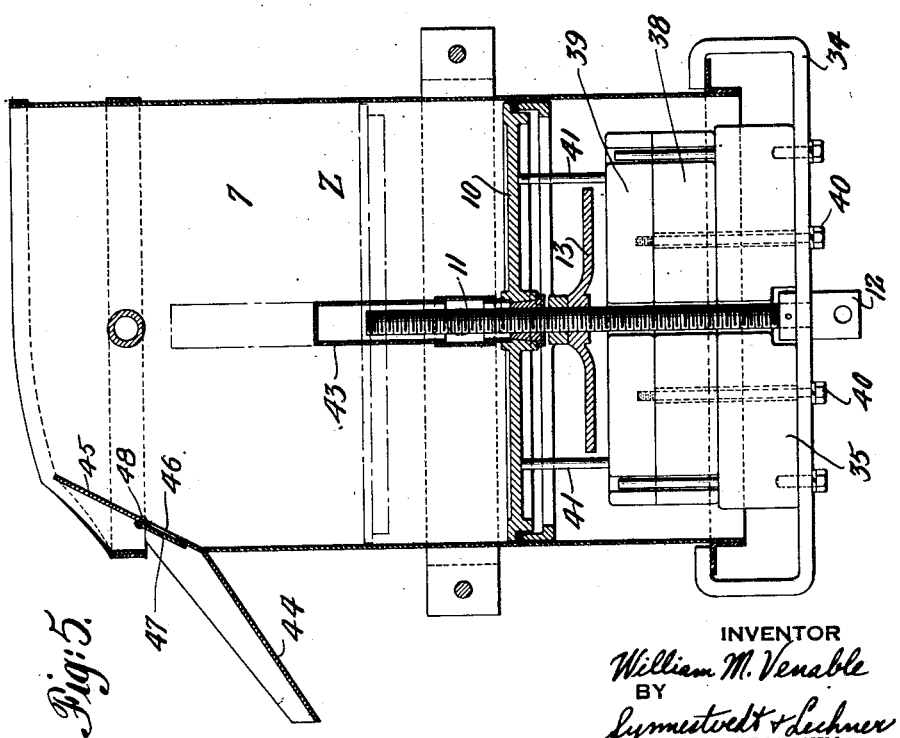
INVENTOR
William M. Venable
BY
Lymestvedt & Lechner
ATTORNEYS Patented Dec. 13, 1932

1,891,032

UNITED STATES PATENT OFFICE

WILLIAM MAYO VENABLE, OF PITTSBURGH, PENNSYLVANIA, ASSIGNOR TO BLAW-KNOX COMPANY, OF PITTSBURGH, PENNSYLVANIA, A CORPORATION OF NEW JERSEY

MATERIAL HANDLING AND MEASURING APPARATUS

Application filed December 26, 1929. Serial No. 416,497.

This invention relates to measuring and dumping apparatus suitable for use in the handling of bulk materials, for example the materials employed in the making of concrete or the like, and more particularly to counterbalancing and shock absorbing mechanism for such apparatus.

While the invention may be employed to advantage in association with apparatus of various kinds where heavy thrusts or forces occur upon the movement of loaded containers or other heavy parts, it is especially useful (and will therefore be herein described) as applied to measuring and dumping containers or vessels of the character illustrated in my copending applications, Serial No. 146,909, filed November 8th, 1926, having matured into Patent No. 1,745,282, of June 28, 1930, for measuring apparatus, and Serial No. 200,270, filed June 20th, 1927, having matured into Patent No. 1,745,777, of February 4, 1930, for measuring and dumping apparatus.

In connection with the measurement of materials for mixing concrete and the like, it has been found to be not only very convenient to mount beneath the supply bins a measuring apparatus capable of being filled from said bins and dumped into a mixer or conveyor, but also very advantageous in that the materials may be accurately measured thereby, for each batch, so that the proportions of the materials in the concrete will be maintained uniform. These advantages particularly accrue when the sand and water are measured together, the sand in the measuring container being saturated with water, for measuring in this way insures accuracy in the amounts of sand and water, which are ordinarily the two most variable constituents of a concrete mix owing primarily to the fact that perfectly dry sand is seldom obtained in practice, and moisture present in the sand in varying degrees causes it to pack differently and also renders uncertain the total quantity of water in the mix.

For the measurement of sand and water in the manner above-indicated, it is of advantage to have the measuring container variable as to volume, and pivotally mounted so that it may be readily and quickly dumped, and in my aforementioned co-pending applications I have illustrated such adjustable measuring containers pivoted at a point which is above the center of gravity when empty and below the center of gravity when loaded so that such vessels will dump and right themselves by gravity. In such dumping and righting, shocks and thrusts are set up which vary according to changes in the adjustment of the volume of the container and differences in the relative positions of the pivot and the center of gravity of the container. In installations of large size, for example where the container is of one or one and a half yards capacity, these thrusts may be quite severe.

One of the primary objects of the present invention is to counteract the effect of the thrust or force of movements of the vessel in apparatus such as that outlined above, and in general to overcome the disadvantages there pointed out.

More specifically the present invention contemplates an adjustable counterweight mechanism associated with the vessel in such manner as to counteract the changes in thrust of the movements of the vessel which are brought about by changes in the effective capacity of the vessel.

The invention further contemplates so relatively proportioning various parts of the construction as to prevent operation of the vessel by gravity when the effective capacity and the counterweight mechanism are not correspondingly adjusted.

Still another object of the invention is the provision of a plurality of water overflow devices associated with the vessel and controllable in such manner as to permit accurate variations in the quantity of water contained in the batches of material which are measured.

How these, and other objects and advantages which are incident to my invention or which may occur to those skilled in the art, are obtained, will be apparent from a consideration of the following description taken with the accompanying drawings which illustrate the preferred embodiment of the apparatus.

Of the drawings:

Figure 1 is a side elevation of a pivoted measuring and dumping container to which the features of the present invention have been applied, the container being in upright or filling position;

Figure 2 is a view similar to Figure 1 with the measuring container in discharging or dumping position;

Figures 3, 4 and 5 are vertical sectional views through the container or vessel illustrating various adjustments of the bottom thereof and the counterweight mechanism; and Figure 6 is a vertical sectional view taken through a cushioning device which is associated with the vessel.

Figure 4:
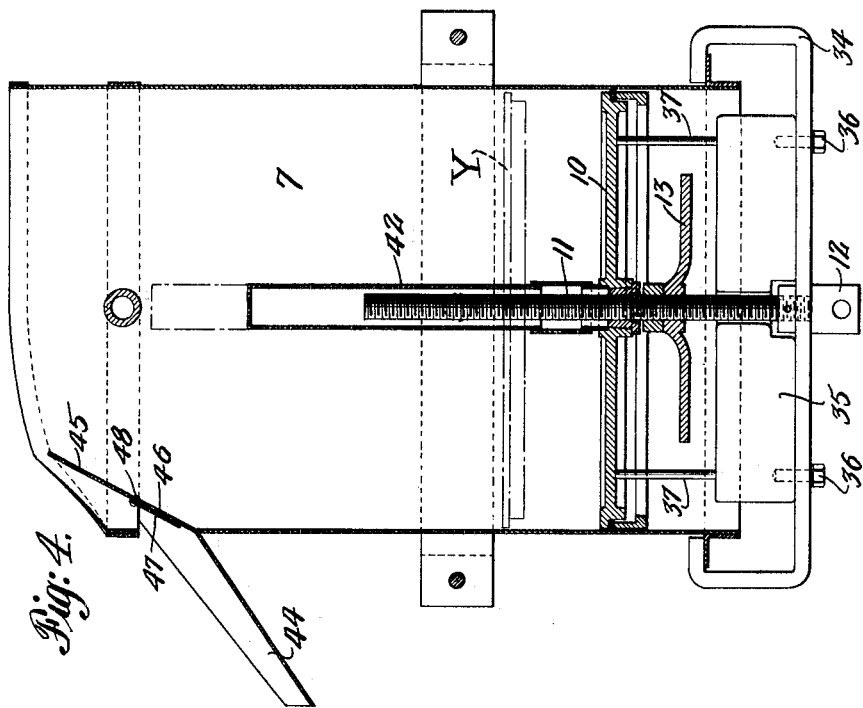

Referring now to Figs. 1 and 2, I have therein shown a supporting structure or frame having side members 2 and cross members 3, 4, on the latter of which is a bearing 5 in which the pivot shaft or pin 6 of the measuring and dumping container 7 is mounted for rotation, it being understood that there is a similar frame structure and bearing on the other side of the container 7. The frame members 2 may be hung from a material supply bin (not shown) located above the container or receptacle 7. The container may be of any desired shape, since it is not per se a part of the present invention, the one illustrated being similar to those shown in my aforementioned co-pending applications. The pivot pins 6, on either side, are located below its center of gravity when loaded and above its center of gravity when empty, so that it will dump and return to filling position by gravity. Suitable latches (not shown) may be provided for holding it in either position. The capacity of the container or vessel may be varied in any preferred manner, as by the insertion therein of anything which will fill a part of the space, or by providing it with an adjustable bottom.

I have here shown such an adjustable bottom 10 (see Figs. 3, 4 and 5) which may be moved up or down on the threaded rod 11 by rotation of the same by means of an apertured block 12 adapted to cooperate with any suitable turning tool (not shown). A locking wing-nut 13 may also be provided in order to secure the bottom in adjusted position. I will not here describe such construction and its operation in detail since it forms a part of my co-pending application Serial No. 146,909 to which reference may be had if desired and is only claimed herein in combination with certain of the new features disclosed herein.

For the cushioning or absorbing of the shocks incident to the dumping and righting of such a container I have provided a pair of pistons 14, 15, connected by rods 16, 17, to arms 18, 19, of a double crank fixed on the rotatable pivot pin 6, said pistons operating in cylinders 20, 21, pivotally mounted at 22, 23, on the frame member 3 or, as here shown, on brackets 24 attached to said frame member.

The cylinder heads 20$b$ and 21$b$ are provided, respectively, with adjustable needle valves 26 and 27 for controllably relieving the pressure in front of the pistons as they move upward, and with intake pipes 28, 29, and check valves 30, 31, respectively, through which air may be admitted into the cylinders as the pistons move downward.

Each piston, to insure a close fit in its cylinder, is provided with a pair of cup leathers 25 (see Fig. 6), and the intake pipes, above their air-inlet openings 28$a$ and 29$a$, may be equipped with regulable lubricators 32 and 33, respectively, to lubricate the pistons and their leathers 25.

According to the present invention the supporting member or strap 34 depending from and extending below the vessel 7 serves not only as a bearing or support for the adjustable screw 11, but also as a means for supporting the counterbalance mechanism now to be described.

The various parts of the container or vessel are so constructed and proportioned relatively to each other as to permit operation of the vessel from filling to dumping position and vice versa, by gravity, with the bottom thereof adjusted for maximum capacity, or adjusted to a point within a limited range approximating the maximum, without the application of any of the counterweights. The range through which this condition obtains as will be seen from inspection of Figure 3 lies between the full line showing of the bottom 10 and the dot and dash line showing thereof at X.

However, the various parts of the structure are so relatively proportioned that with the bottom adjusted for effective vessel capacity appreciably smaller than the capacity resulting from the adjustment of the bottom 10 to the dot and dash position of Figure 3, the movement of the vessel from dumping to filling position will not be effected by the action of gravity on account of the consequent rise in the center of gravity of the vessel as a whole with respect to its pivot axis. Furthermore, with the smaller capacity adjustment, the batch of material being measured will raise the center of gravity of the vessel when loaded still further with the result that the thrust of the movement of the vessel from filling to dumping position is increased to such a point as to cause greatly increased shocks and strains on the cushioning mechanism as well as on other parts of the structure. In order to overcome the foregoing difficulties the present invention contemplates the provision of a counterweight mechanism including a weight 35 adapted to be supported on the strap 34, as by means of bolts 36, between such strap and the overlying bottom 10 as clearly illustrated in Figure 4. The adjustment of the bottom 10, when the weight 35 is properly positioned is limited by the studs or rods 37 which are carried by the weight. The purpose of this adjustment limiting device will appear more clearly hereinafter. The range of adjustment within which the movements of the vessel will be operative by gravity, with the weight 35 applied lies between the full line showing of the bottom 10 in Figure 4 and the dot and dash line showing Y thereof in the same figure.

In like manner when still smaller capacity adjustments are desirable, additional counterweights 38 and 39 (see Fig. 5) are applied, the same being positioned above the weight 35 and secured in place by means of the bolts 40. The weight 39 is also provided with adjustment limiting rods as indicated by the reference numeral 41. The proper range of adjustment of the bottom 10, when both of the counterweight devices are employed, extends between the full line showing of the bottom and the dot and dash line showing Z thereof (see Fig. 5).

Figure 5:
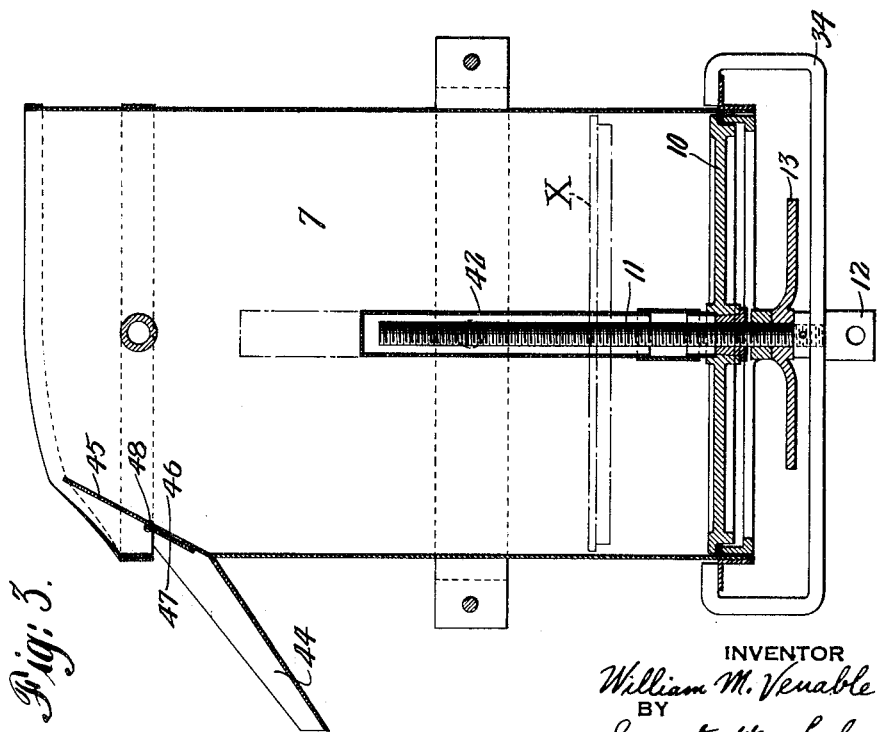

With certain adjustments within the range illustrated in Figure 5 as well as with still smaller capacity adjustments the protecting sleeve or housing 42 for the screw 11 (see Figs. 3 and 4) is replaced by a shorter housing 43 in order that such housing shall not interfere with any parts of the construction above or at the top of the container.

From the foregoing it should be apparent that with the apparatus of the present invention the alterations or variations in thrust of the movements of the vessel are at least partially counteracted (by corresponding adjustments of the bottom of the vessel and of the counterweight mechanism) so that shocks to the cushioning and other parts of the construction are maintained more nearly uniform than has been possible heretofore. In addition the adjustable needle valves of the cushioning cylinders may be employed to compensate for the relatively small alterations or variations in the center of gravity of the vessel as a whole which result from adjustments of the bottom 10 within the various ranges illustrated in Figs. 3, 4 and 5.

It should be observed that in order to make certain that the operator of the device on the "job" will apply the proper counterweight for any particular capacity adjustment which may be employed, the various elements or parts of the entire container or vessel are so arranged and proportioned with respect to each other as to prevent movement of the vessel, by gravity, from dumping to filling position unless such counterweight mechanism is properly adjusted. In this way undue or abnormal shocks to the apparatus are eliminated because when the vessel is once dumped, it will not return to filling position.

The rods or stops 37 and 41 serve to prevent the downward adjustment of the bottom 10 to such point as would cause the center of gravity of the container as a whole to move downwardly abnormally when the counterweight devices are being employed. If such condition were permitted, abnormal shocks would be delivered to various parts of the construction on movement of the vessel from dumping back to filling position.

In addition to the above, the present invention contemplates the provision of a novel water overflow mechanism for a pivoted container or vessel of the type disclosed herein. By reference to Figures 3, 4 and 5, it will be seen that this water overflow mechanism includes a discharge spout 44 and a baffle wall 45 adjacent thereto at the top of the vessel. The wall 45 is provided with one or more openings 46 adapted to be closed by means of some suitable valve or, as shown in the drawings, by means of a plate 47 secured to the wall 45 adjacent its opening as by means of studs 48.

This arrangement, in effect, provides a pair of vertically spaced water overflow means when the vessel is in filling position, one over the top edge of the plate 45 and the other through the opening 46 thereof when the cover plate is removed. It will be apparent, therefore, that if desired, all of the material measured in the container may be inundated and dumped in such condition by maintaining the cover plate 47 in closed position. On the other hand where the specifications for the "mix" call for a smaller amount of water, the lower overflow 46 may be opened and thus employed to limit the inundation to only a portion of the sand or other material being measured. Since the change in water level will also have an effect upon the balance of weight, the counterweight adjustment may be arranged to compensate for this also.

It is apparent from the foregoing that the apparatus of the present invention greatly simplifies and facilitates mixing of materials, particularly sand and water, for use in making concrete and the like and also that the apparatus provides for counteracting or counterbalancing as well as cushioning of the thrusts, shocks and strains encountered in various operating conditions.

I claim:—

1. In apparatus of the character described the combination of a material handling vessel mounted for movement to different positions for filling and dumping, means for varying the capacity of the vessel, and means adapted to be carried by the vessel and adjustable to at least partially counteract the changes in thrust of a movement of the vessel resulting from adjustments of capacity.

2. In apparatus of the character described the combination of a material handling vessel mounted for movement to different positions for filling and dumping, means for varying the capacity of the vessel, means for cushioning a movement thereof and means adapted to be carried by the vessel and adjustable to at least partially counteract changes in thrust of the vessel due to adjustment of capacity.

3. A material measuring and dumping vessel of the character described having pivot means located below the center of gravity when loaded but above the center of gravity when empty, means for adjusting its effective capacity and adjustable counterbalance means arranged to control center of gravity location.

4. A material measuring and dumping vessel of the character described having pivot means located below the center of gravity when loaded but above the center of gravity when empty, means for adjusting its effective capacity and adjustable counterweight means therefor, said last two means being operatively associated with each other in such manner that the adjustment of one predetermines the necessary adjustment of the other.

5. In apparatus of the character described the combination of a material handling vessel mounted for movement to different positions for filling and dumping, means for varying the capacity of the vessel, means for cushioning a movement thereof and means carried by the vessel and adjustable to at least partially counteract the changes in force of the cushioned movement resulting from adjustments of capacity.

6. In apparatus of the character described the combination of a material handling vessel mounted for movement to different positions for filling and dumping, means for varying the capacity of the vessel, means for cushioning a movement thereof and means associated therewith and adjustable to at least partially counteract the changes in force of the cushioned movement resulting from adjustments of capacity, the foregoing elements of the structure being corelated in such manner as to render the apparatus at least partially inoperative when the counteracting means and the capacity varying means are not relatively adjusted to points within predetermined ranges.

7. Material handling apparatus including a vessel mounted for pivotal movement to different positions for filling and dumping, the bottom of said vessel being adjustable to vary the capacity thereof, and counterweight means associated with the vessel and adjustable to at least partially compensate for the changes in the center of gravity thereof incident to adjustment of its capacity.

8. Material handling apparatus including a vessel mounted for pivotal movement to different positions for filling and dumping, the bottom of said vessel being adjustable to vary the capacity thereof, and counterweight means associated with the vessel and adjustable to at least partially compensate for the changes in the center of gravity thereof incident to adjustment of its capacity, the adjustment of said counterweight means being dependent upon capacity adjustments.

9. Material handling apparatus including a vessel mounted for pivotal movement to different positions for filling and dumping, means for varying the capacity of the vessel and means adjustable to maintain the centers of gravity of the vessel when charged and empty within predetermined ranges at different sides of the pivot axis thereof.

10. Material handling apparatus including a vessel mounted for pivotal movement to different positions for filling and dumping, means for varying the capacity of the vessel and means adjustable to maintain the centers of gravity of the vessel when charged and empty within predetermined ranges at different sides of the pivot axis thereof, together with means for cushioning movements of the vessel.

11. Material handling apparatus including a vessel mounted for pivotal movement to different positions for filling and dumping, means for varying the capacity of the vessel and means adjustable to maintain the centers of gravity of the vessel when charged and empty within predetermined ranges at different sides of the pivot axis thereof, together with adjustable means for cushioning movements of the vessel.

12. In apparatus of the character described the combination of a material handling vessel mounted for movement to different positions for filling and dumping, means for varying the capacity of the vessel, adjustable means for cushioning a movement thereof and means carried by the vessel and adjustable to at least partially counteract the changes in force of the cushioned movement resulting from adjustments of capacity.

13. In apparatus of the character described the combination of a material handling vessel mounted for tilting movement and having a bottom adjustable to vary its capacity and counterweight means adapted to be carried by the vessel adjacent its bottom when the said bottom is adjusted to a point within a predetermined range.

14. In apparatus of the character described the combination of a material handling vessel having side and bottom walls and being mounted for tilting movement, means for adjusting the bottom wall to vary the capacity of the vessel including a supporting member secured to the vessel and extended therebelow and counterweight means adapted to be positioned between the said bottom and the supporting member when the former is adjusted to a point within a predetermined range.

15. In apparatus of the character described the combination of a material handling vessel having side and bottom walls and being mounted for tilting movement, means for adjusting the bottom wall to vary the capacity of the vessel including a supporting member secured to the vessel and extended therebelow and counterweight means adapted to be positioned between the said bottom and the supporting member when the former is adjusted to a point within a predetermined range, said counterweight means being supported by the supporting member.

16. In apparatus of the character described the combination of a material handling vessel having side and bottom walls and being mounted for tilting movement, means for adjusting the bottom wall to vary the capacity of the vessel including a supporting member secured to the vessel and extended therebelow and counterweight means adapted to be positioned between the said bottom and the supporting member when the former is adjusted to a point within a predetermined range, together with additional counterweight means adapted to be associated with the vessel when the said bottom is adjusted to a point within another predetermined range.

17. In apparatus of the character described the combination of a material handling vessel having side and bottom walls and being mounted for tilting movement to filling and dumping positions by the action of gravity thereon when empty and full, respectively, means for adjusting the bottom wall to vary the capacity of the vessel and counterweight means adapted to be associated with the vessel when its bottom wall is adjusted to a point within a predetermined range, the foregoing elements of the structure being relatively proportioned and arranged in such manner as to render the action of gravity inoperative for one of the movements of the vessel with its bottom adjusted to a point within said predetermined range and without the counterweight means being associated therewith.

18. In apparatus of the character described, a solid and liquid measuring vessel mounted for movement between filling and dumping positions, means for altering the effective volumetric capacity of the vessel, water overflow means, and means for altering the effective height of the overflow means, together with adjustable counterbalance means for the vessel and means for cushioning movement of the vessel.

19. In mechanism of the character described, a pivotally mounted vessel for measuring sand and water for use in mixing concrete, said vessel having spaced apart water overflow means at least one of which provides for water overflow at a level below that to which the vessel is adapted to be charged in measuring.

20. In mechanism of the character described, a pivotally mounted vessel for measuring sand and water for use in mixing concrete, said vessel having spaced apart water overflow means and means for closing one of the overflow means, at least one of said water overflow means being arranged to provide water overflow at a level below that to which the vessel is adapted to be charged in measuring.

21. In mechanism of the character described, a vessel for measuring sand and water for use in mixing concrete, said vessel being mounted for pivotal movement to different positions for filling and dumping and being provided with a plurality of water overflow means vertically spaced from each other when the vessel is in filling position, at least one of said water overflow means being arranged to provide water overflow at a level below that to which the vessel is adapted to be charged in measuring.

22. In mechanism of the character described, a vessel for measuring sand and water for use in mixing concrete, said vessel being mounted for pivotal movement to different positions for filling and dumping and being provided with a plurality of water overflow means vertically spaced from each other when the vessel is in filling position, together with means for closing one of the overflow means, at least one of said water overflow means being arranged to provide water overflow at a level below that to which the vessel is adapted to be charged in measuring.

23. In mechanism of the character described, a vessel for measuring sand and water for use in mixing concrete, said vessel being mounted for pivotal movement to different positions for filling and dumping and being provided with two water overflow means vertically spaced from each other when the vessel is in filling position, together with means for closing the lower of said overflow means, at least one of said water overflow means being arranged to provide water overflow at a level below that to which the vessel is adapted to be charged in measuring.

24. A material measuring and dumping vessel of the character described having pivot means located below the center of gravity when loaded but above the center of gravity when empty, means for adjusting its effective capacity and adjustable counterbalance means adapted to be carried by the vessel for pivotal movement therewith.

25. A material measuring and dumping vessel of the character described having pivot means located below the center of gravity when loaded but above the center of gravity when empty, means for adjusting its effective capacity and adjustable counterbalance means arranged to control the center of gravity location, said last two means being operatively inter-related so that the adjustment of one predetermines the necessary adjustment of the other.

26. In apparatus of the character described the combination of a material handling vessel mounted for movement to different positions for filling and dumping, means for adjusting the capacity of the vessel, means for cushioning a movement thereof, separate means, adjustable to counteract, at least in part, changes in thrust of movement of the vessel due to adjustment of capacity, and means cooperating with the capacity adjusting means and with said thrust counteracting means for operatively inter-relating the operation of the two means.

27. In apparatus of the character described, a solid and liquid measuring vessel mounted for movement between filling and dumping positions, water overflow means for the vessel, means for adjusting the effective volumetric capacity of the vessel, and means, operative in different capacity adjustments, for altering the effective height of the water overflow means.

28. In apparatus of the character described, a solid and liquid measuring vessel mounted for movement between filling and dumping positions, water overflow means for the vessel, means for adjusting the effective volumetric capacity of the vessel, and means, operative in different capacity adjustments, for altering the effective height of the water overflow means, together with adjustable counterbalance means for the vessel.

In testimony whereof I have hereunto signed my name.

WILLIAM MAYO VENABLE.